United States Patent
Sherman

(10) Patent No.: US 6,444,131 B1
(45) Date of Patent: Sep. 3, 2002

(54) TREATMENT OF CONTAMINATED LIQUIDS WITH OXIDIZING GASES AND LIQUIDS

(75) Inventor: Jeffrey H. Sherman, Dallas, TX (US)

(73) Assignee: GRT, Inc., The Woodlands, TX (US)

( * ) Notice: Subject to any disclaimer, the term of this patent is extended or adjusted under 35 U.S.C. 154(b) by 0 days.

(21) Appl. No.: 09/619,009

(22) Filed: Jul. 19, 2000

Related U.S. Application Data

(63) Continuation-in-part of application No. 09/418,445, filed on Oct. 15, 1999, which is a continuation-in-part of application No. 09/325,503, filed on Jun. 3, 1999, now Pat. No. 6,103,130.

(51) Int. Cl.$^7$ .................................................. C02F 1/72
(52) U.S. Cl. ..................... 210/758; 210/760; 210/765
(58) Field of Search ................................ 210/758, 760, 210/763, 765, 748

(56) References Cited

U.S. PATENT DOCUMENTS

| 4,141,830 A | * | 2/1979 | Last |
| 5,849,201 A | * | 12/1998 | Bradley |
| 6,030,526 A | * | 2/2000 | Porter |

* cited by examiner

*Primary Examiner*—Betsey Morrison Hoey
(74) *Attorney, Agent, or Firm*—Michael A. O'Neil

(57) ABSTRACT

In a method of removing organic and biological contaminants from a liquid, an oxidizing gas is formed into sub-micron size bubbles which are dispersed into an initially contaminated liquid, after which the treated liquid is recovered. The oxidizing gas is preferably selected from a group including ozone and chlorine dioxide and is utilized immediately upon its manufacture. An oxidizing liquid may be employed in conjunction with the oxidizing gas. The method may be practiced repeatedly. A base may be added to the contaminated liquid to raise the pH thereof.

1 Claim, 10 Drawing Sheets

US 6,444,131 B1

TREATMENT OF CONTAMINATED LIQUIDS WITH OXIDIZING GASES AND LIQUIDS

CROSS-REFERENCE TO RELATED APPLICATION

This application is a continuation-in-part of application Ser. No. 09/418,445 filed Oct. 15, 1999, currently pending which is a continuation-in-part of application Ser. No. 09/325,503 filed Jun. 3, 1999, now U.S. Pat. No. 6,103,130.

TECHNICAL FIELD

This invention relates generally to the treatment of contaminated liquids with oxidizing gases and oxidizing liquids, and more particularly to the treatment of liquids of the type having organic and/or biological contaminants contained therein with oxidizing gases such as ozone and chlorine dioxide and with oxidizing liquids such as hydrogen peroxide.

BACKGROUND AND SUMMARY OF THE INVENTION

As is well known, various liquids are contaminated by organic materials. For example, used lubricating oil frequently includes organic materials comprising products of combustion. Waste water is almost always contaminated by organic materials such as human and animal waste, decaying vegetable materials, biological microorganisms, etc.

As is also well known, organic and/or biological contaminants can be removed from liquids by exposing the contaminated liquids to oxidizing agents, particularly oxidizing gases. Ozone and chlorine dioxide are among the most potent of the oxidizing gases, and therefore offer tremendous potential with respect to the removal of organic contaminants from used lubricating oil, waste water, drinking water, and other liquids. Unfortunately, the inherent instability of ozone and chlorine dioxide has heretofore limited the efficient commercial utilization thereof in the removal of organic contaminants from liquids.

Another problem involved in the removal of organic contaminants from liquids is the time duration of the exposure of an oxidizing agent to the contaminants in the liquid. As is known from Stoke's Law, larger bubbles rise faster in a given liquid. Because it has heretofore not been possible to generate sub-micron size bubbles of oxidizing gases, much larger bubbles, bubbles in the 100–500 micron range, have necessarily been used. Due to the relatively rapid movement of larger bubbles, towers having substantial vertical height have been required in order to increase the time duration of the exposure of the oxidizing gas to the contaminated liquid. Unfortunately, increasing height of the tower increases the pressure that is necessary to overcome head pressure in order to disperse the oxidizing gas in the liquid to be treated. Especially with ozone, the compression of the oxidizing gas can lead to decomposition of the gas through the following reaction, which is, at least partially, a second order kinetic mechanism.

$$2O_3 \rightarrow 3O_2$$

Thus, requiring higher pressure in the oxidizing gas can be detrimental in several ways.

Organic contaminants can also be removed from liquids by means of oxidizing liquids such as hydrogen peroxide. Oxidizing liquids are typically quite expensive relative to oxidizing gases. For this reason it has heretofore been impractical to utilize oxidizing liquids in wastewater treatment and similar large scale operations.

The present invention comprises a method of and apparatus for utilizing oxidizing gases and oxidizing liquids to remove organic and/or biological contaminants from liquids which overcomes the foregoing and other problems long since associated with the prior art. In accordance with the one aspect of the invention, oxidizing gas is utilized at its source and is formed into sub-micron size bubbles which are immediately dispersed into a flowing liquid to be decontaminated. Due to the sub-micron size of the bubbles, the surface area of the oxidizing gas is greatly increased, thereby greatly increasing the efficiency of the gas in transferring to the liquid and ultimately oxidizing organic and/or biological contaminants from the liquid. This in turn substantially reduces the vertical height necessary to effectively treat the contaminated liquid, thereby substantially reducing the pressure at which the oxidizing gas is used.

In accordance with a first application of the invention, an oxidizing gas is selected from the group including ozone and chlorine dioxide. The oxidizing gas is formed into sub-micron size bubbles by directing it through a sintered glass, sintered ceramic, or porous ceramic tube. Used lubricating oil is caused to flow over the surface of the sintered/porous tube. The flowing liquid cleaves sub-micron size bubbles of the oxidizing gas from the surface of the tube. The sub-micron size bubbles of oxidizing gas are dispersed into the used lubricating oil, whereupon organic contaminants contained within the used lubricating oil are efficiently oxidized.

In accordance with a second application of the invention, an oxidizing gas is selected from the group including ozone and chlorine dioxide. The oxidizing gas is formed into sub-micron sized bubbles by directing it through a sintered glass, sintered ceramic, or porous ceramic tube. Waste water or drinking water is caused to flow over the surface of the tube. The flowing liquid cleaves sub-micron size bubbles of the oxidizing gas from the surface of the tube. The sub-micron size bubbles of oxidizing gas are dispersed into the water, whereupon organic and/or biological contaminants contained within the waste water are efficiently oxidized.

In accordance with a third aspect of the invention, the surface of the sintered glass, sintered ceramic or porous ceramic tube is provided with a coating of a radiation-activated catalyst such as titanium dioxide. During operation, the catalyst is activated by exposure to ultraviolet radiation, sunlight, visible light, or other electromagnetic radiation. Activation of the catalyst causes the formation of hydroxyl radicals in contaminated water which augment the action of an oxidizing gas or an oxidizing liquid in the removal of organic contaminants from the water.

In accordance with a fourth aspect of the invention, ultraviolet radiation is directed through a contaminated liquid during the dispersal of sub-micron size bubbles comprising an oxidizing gas therein. The oxidizing gas is preferably selected from the group including ozone and chlorine dioxide. The ultraviolet energy substantially improves the kinetics of the reaction whereby contaminants in the liquid are rapidly oxidized. Further, in the case of ozone, the UV light activates the ozone and destroys residual ozone minimizing or eliminating after treatment.

In accordance with a fifth aspect of the invention, sodium hydroxide or other base is injected into the flowing contaminated liquid such that the pH is greater than 8 prior to contacting the liquid with the ozone. The higher pH ensures the conversion of ozone to hydroxyl radical, a powerful oxidizing agent. Further, the higher pH ensures complete ozone destruction.

In accordance with a sixth embodiment of the invention, two or more gas contacting chambers may be placed in series. The gas contacting chambers may be constructed in accordance with any of the various aspects of the invention described hereinabove.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
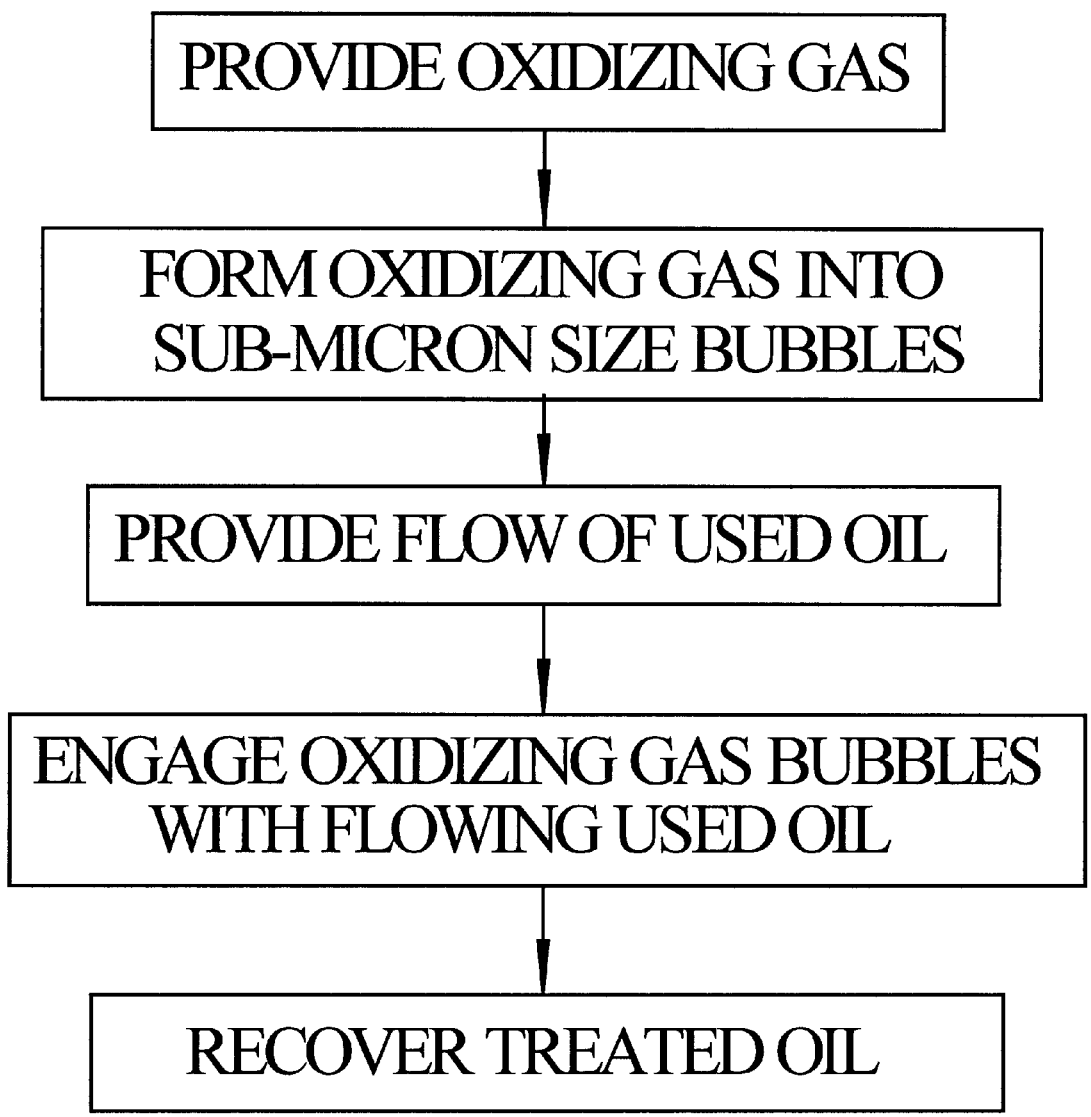
FIG. 1 is a flow chart illustrating a first embodiment of the invention.

Referring now to the Drawings, and particularly to FIG. 1 thereof, there is shown a method for the treatment of contaminated liquids with oxidizing gases comprising a first embodiment of the invention. The first step of the method comprises the manufacture of an oxidizing gas utilizing conventional and well known techniques. The oxidizing gas is preferably selected from the group including ozone and chlorine dioxide, however, other oxidizing gases may be utilized in the practice of the invention, if desired. Immediately upon its manufacture, the selected oxidizing gas is formed into sub-micron size bubbles.

A quantity of used lubricating oil having organic contaminants contained therein, such as compounds of sulfur, nitrogen, etc., is caused to flow into engagement with the sub-micron size bubbles of oxidizing gas. The oxidizing gas bubbles are dispersed into the used lubricating oil whereupon organic and/or biological contaminants contained within the oil are immediately oxidized. The sub-micron size of the bubbles of the oxidizing gas greatly increases the surface area of the oxidizing gas/used lubricating oil interface thereby substantially increasing the efficiency of the oxidizing reaction. Upon completion of the oxidation reaction, the treated lubricating oil is recovered for further processing and/or reuse.

Figure 2:
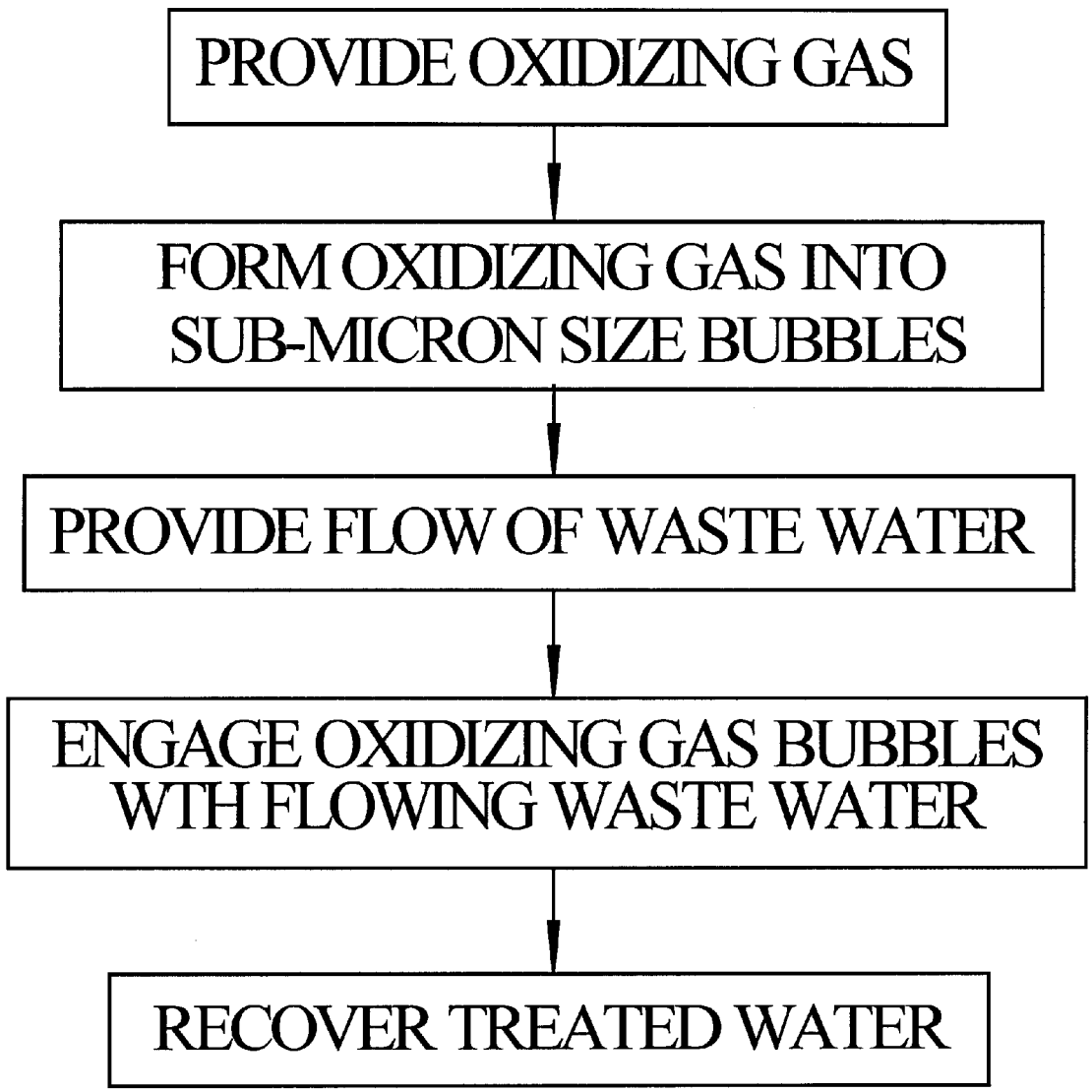
FIG. 2 is a flow chart illustrating a second embodiment of the invention.

Referring to FIG. 2, there is shown a method for the treatment of contaminated liquids with oxidizing gases comprising a second embodiment of the invention. The first step of the method comprises the manufacture of an oxidizing gas utilizing conventional and well known techniques. The oxidizing gas is preferably selected from the group including ozone and chlorine dioxide, however, other oxidizing gases may be utilized in the practice of the invention, if desired. Immediately upon its manufacture, the selected oxidizing gas is formed into sub-micron size bubbles.

A quantity of waste water having organic and/or biological contaminants contained therein is caused to flow into engagement with the sub-micron size bubbles of oxidizing gas. The oxidizing gas bubbles are dispersed into the waste water whereupon organic contaminants contained within the water are immediately oxidized. The sub-micron size of the bubbles of the oxidizing gas greatly increases the surface area of the oxidizing gas/waste water interface thereby substantially increasing the efficiency of the oxidizing reaction. Upon completion of the oxidation reaction, the treated water is recovered for discharge, further processing, and/or reuse.

Figure 3:
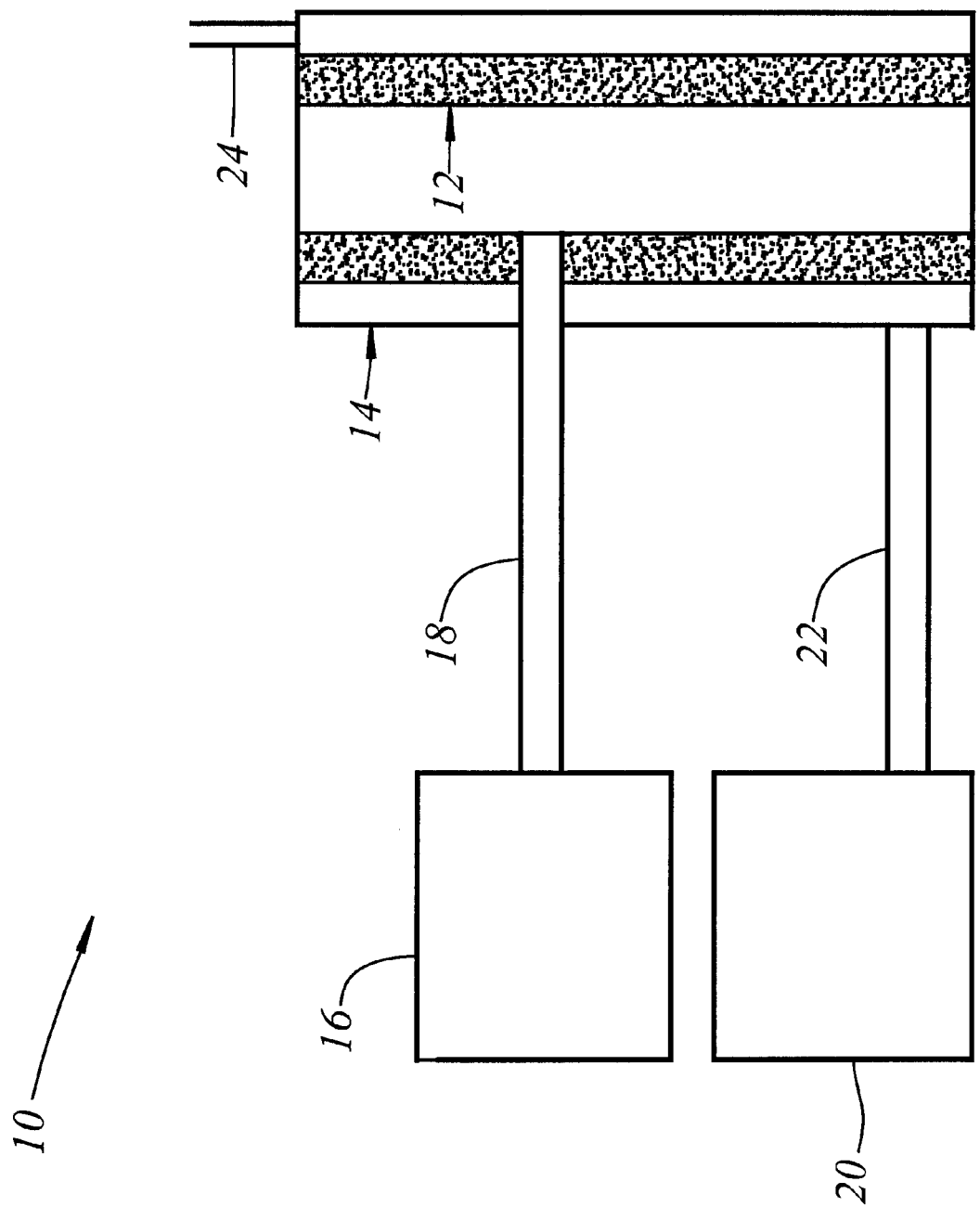
FIG. 3 is a diagrammatic illustration of a first apparatus useful in the practice of the method of the invention.

Referring now to FIG. 3 there is shown an apparatus 10 which may be utilized in the practice in the method of the invention. The apparatus 10 includes a hollow tube 12 formed from sintered glass, sintered ceramic, or porous ceramic. Those skilled in the art will know and understand that other porous materials not subject to attack by oxidizing agents may be used in the practice of the invention. The sintered/porous tube 12 is positioned within a tank 14.

An oxidizing gas is manufactured within a source 16 utilizing conventional and well known techniques. The oxidizing gas is preferably selected from the group including ozone and chlorine dioxide, however, other oxidizing gases may be utilized in the practice of the invention if desired. Immediately upon its manufacture the oxidizing gas from the source 16 is directed into the interior of the sintered/porous tube 12 through piping 18.

Meanwhile a liquid having organic and/or biological contaminants initially contained therein is caused to flow from a source 20 through piping 22 and the tank 14 to an outlet 24. The source 20 may comprise a conventional reservoir, tank, etc., which receives contaminated liquid from one or more sources. Alternatively, the source 20 may comprise the discharge from a facility which produces contaminated liquid in its operation.

The pressure of the oxidizing gas within in the interior of the sintered/porous tube 12 is maintained high enough to prevent liquid contained within the tank 14 from flowing inwardly through the tube 12 into the interior thereof. Rather, oxidizing gas flows outwardly from the interior of the tube 12 under substantially less pressure than would be required in prior art apparatus. As the oxidizing gas flows outwardly, it is formed into sub-micron size bubbles which leave the exterior surface of the sintered glass, sintered ceramic, or porous ceramic tube 12 and are dispersed in the contaminated liquid.

As the initially contaminated liquid from the source 20 flows through the tank 14, it passes over the exterior surface of the sintered/porous tube 12 thereby cleaving the sub-micron size bubbles of oxidizing gas from the exterior surface thereof. The sub-micron sized bubbles of oxidizing gas are immediately dispersed throughout the flowing liquid, whereupon organic contaminants contained within the liquid are immediately oxidized. It will be appreciated that because of the sub-micron size of the bubbles comprising the oxidizing gas the surface area of the interface between the oxidizing gas and the initially contaminated liquid is greatly increased, thereby greatly increasing the efficiency of the oxidizing reaction.

Figure 4:
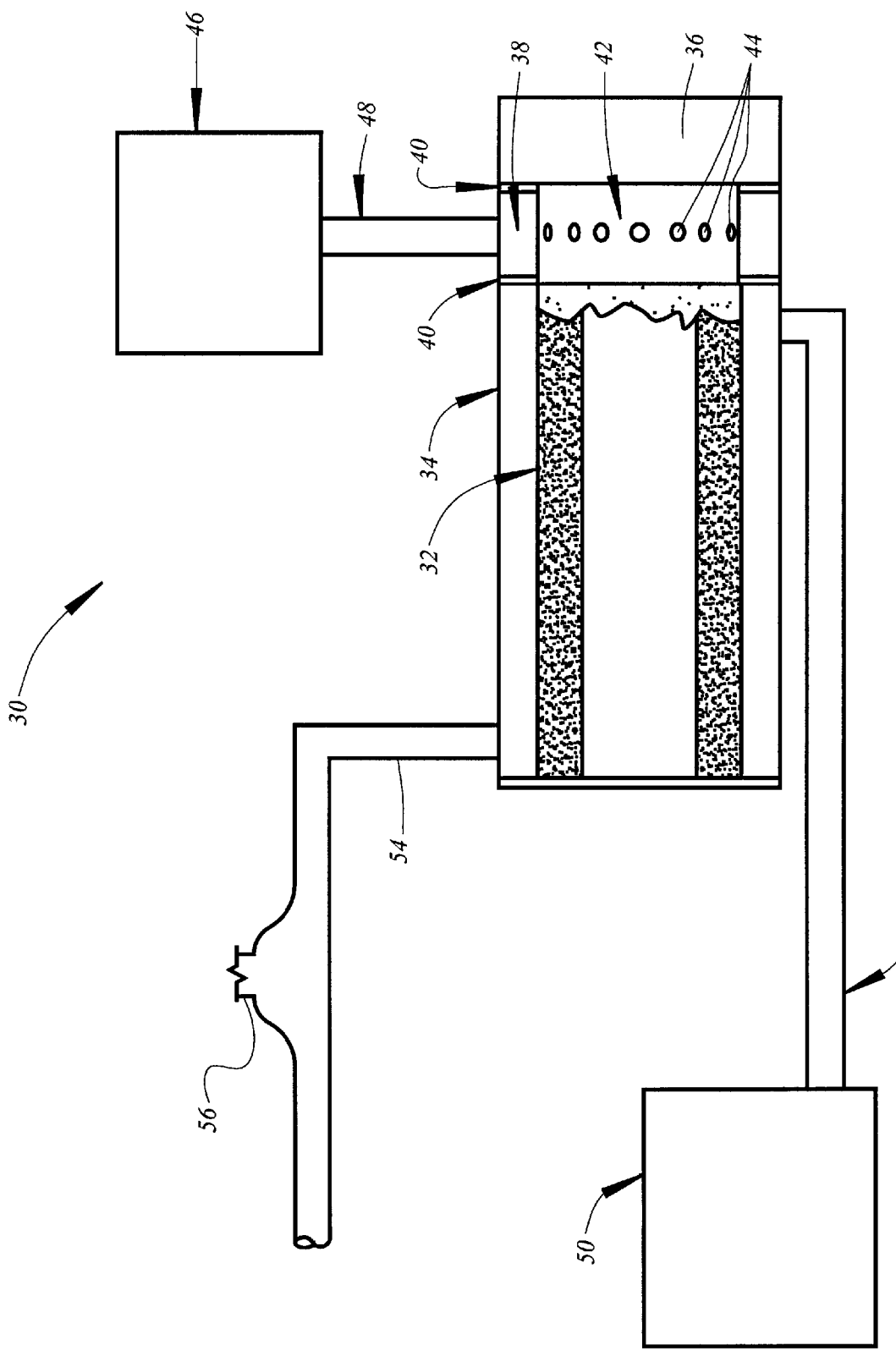
FIG. 4 is a diagrammatic illustration of a second apparatus useful in the practice of the method of the invention.

An alternative apparatus 30 which may be utilized in the practice of the method of the invention is illustrated in FIG. 4. The apparatus 30 includes a sintered glass, sintered ceramic, or porous ceramic tube 32 having a hollow interior which is supported within a tank 34 for rotation about its longitudinal axis. A motor 36 is positioned at one end of the tank 34 and is operatively connected to the tube 32 to effect rotation thereof relative to the tank 34. An annulus 38 is located at one end of the tank 34 and is separated from the tank 34 and from the motor 36 by seals 40. A collar 42 connects the annulus 38 to the interior of the sintered/porous tube 32 through a plurality of passageways 44.

In the operation of the apparatus 30 an oxidizing gas is manufactured within a source 46 utilizing conventional and well known techniques. The oxidizing gas is preferably selected from the group including ozone and chlorine dioxide, however, other oxidizing gases may be utilized in the practice of the invention. Immediately upon its manufacture the oxidizing gas is directed into the annulus 38 through piping 48. From the annulus 38 the oxidizing gas flows into the interior of the sintered glass, sintered ceramic, or porous ceramic tube through the passageways 44 of the collar 42.

A liquid having organic and/or biological contaminants contained therein is received from a source 50. The source 50 may comprise a conventional reservoir or tank which receives the contaminated liquid from one or more sources. Alternatively, the source 50 may comprise the discharge of a facility which produces contaminated liquid as a part of its operation.

Liquid having contaminants contained therein continuously flows from the source 50 through piping 52 and through the tank 34 to an outlet 54. The pressure of the oxidizing gas within the hollow interior of the tube 32 is maintained sufficiently high that liquid flowing through the tank 34 does not flow inwardly through the tube 32 into the interior thereof. Rather, oxidizing gas from the source 46 flows outwardly from the interior of the sintered or porous tube 32 to the outer surface thereof.

The outwardly flowing oxidizing gas accumulates on the exterior surface of the sintered/porous tube 32 in the form of sub-micron size bubbles. The sub-micron size bubbles of oxidizing gas are immediately cleaved from the exterior surface of the sintered/porous tube by the flow of the initially contaminated liquid over the exterior surface of the sintered/porous tube 32. The sub-micron sized bubbles are dispersed throughout the flowing liquid whereby the contaminants initially contained within the flowing liquid are immediately oxidized. The sub-micron size of the bubbles of the oxidizing gas greatly increases the size of the interface between the oxidizing gas and the initially contaminated liquid, thereby greatly increasing the efficiency of the oxidation reaction.

Treated liquid is recovered through the outlet 54. It is contemplated that all of the oxidizing gas will be consumed by the oxidizing reaction. If not, excess oxidizing gas may be recovered from the treated liquid through an outlet 56 and thereafter properly disposed of.

In the operation of the apparatus 30 shown in FIG. 4, the exterior surface of the tube 32 is rotated relative to the liquid flowing through the tank 34 under the action of the motor 36. By this means the relative movement between the exterior surface of the tube 32 and the initially contaminated liquid flowing through the tank 34 is greatly increased. This in turn increases the number of sub-micron sized bubbles of oxidizing gas which are dispersed into the flowing liquid, thereby increasing the efficiency of the oxidation reaction.

Figure 5:
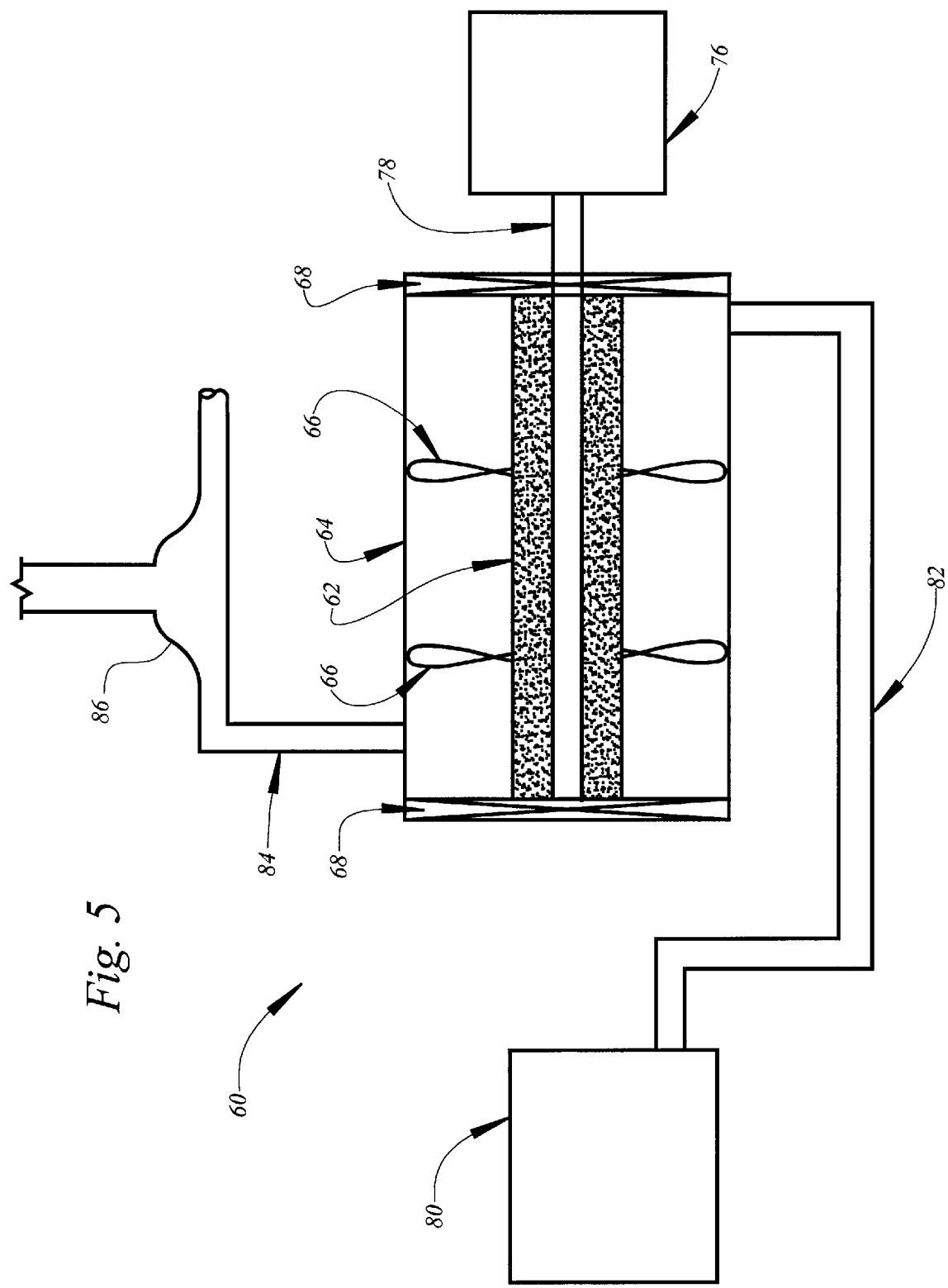
FIG. 5 is a diagrammatic illustration of a third apparatus useful in the practice of the method of the invention.

An alternative apparatus 60 which may be utilized in the practice of the method of the invention is illustrated in FIG. 5. The apparatus 60 includes a sintered glass, sintered ceramic, or porous ceramic tube 62 having a hollow interior which is supported within a tank 64 for rotation about its longitudinal axis. One or more turbines 66 are mounted on the sintered/porous tube 62 to effect rotation thereof relative to the tank 64.

In the operation of the apparatus 60 an oxidizing gas is manufactured within a source 76 utilizing conventional and well known techniques. The oxidizing gas is preferably selected from the group including ozone and chlorine dioxide, however, other oxidizing gases may be utilized in the practice of the invention. Immediately upon its manufacture the oxidizing gas is directed into the interior of the sintered or porous tube 62.

A liquid having organic and/or biological contaminants contained therein is received from a source 80. The source 80 may comprise a conventional reservoir or tank which receives the contaminated liquid from one or more sources. Alternatively, the source 80 may comprise the discharge of a facility which produces contaminated liquid as a part of its operation.

Liquid having contaminants contained therein continuously flows from the source 80 through piping 82 and through the tank 64 to an outlet 84. The pressure of the oxidizing gas within the hollow interior of the tube 62 is maintained sufficiently high that liquid flowing through the tank 64 does not flow inwardly through the tube 62 into the interior thereof. Rather, oxidizing gas from the source 76 flows outwardly from the interior of the tube 62 to the outer surface thereof.

The outwardly flowing oxidizing gas accumulates on the exterior surface of the sintered/porous tube 62 in the form of sub-micron size bubbles. The sub-micron size bubbles of oxidizing gas are immediately cleaved from the exterior surface of the sintered/porous tube by the flow of the initially contaminated liquid over the exterior surface of the tube 62. The sub-micron sized bubbles are dispersed throughout the flowing liquid whereby the organic contaminants initially contained within the flowing liquid are immediately oxidized. The sub-micron size of the bubbles of the oxidizing gas greatly increases the size of the interface between the oxidizing gas and the initially contaminated liquid, thereby greatly increasing the efficiency of the oxidation reaction.

Treated liquid is recovered through the outlet 84. It is contemplated that all of the oxidizing gas will be consumed by the oxidizing reaction. If not, excess oxidizing gas may be recovered from the treated liquid through an outlet 86 and thereafter properly disposed of.

In the operation of the apparatus 60 shown in FIG. 5 the exterior surface of the sintered/porous tube 62 is rotated relative to the liquid flowing through the tank 64 under the action of the turbines 66. By this means the relative movement between the exterior surface of the sintered tube 62 and the initially contaminated liquid flowing through the tank 64 is greatly increased. This in turn increases the number of sub-micron sized bubbles of oxidizing gas which are dispersed into the flowing liquid, thereby increasing the efficiency of the oxidation reaction.

Those skilled in the art will appreciate the fact that the use of the apparatus 30 shown in FIG. 4 or the apparatus 60 shown in FIG. 5 provides certain advantages with respect to the use of the apparatus shown in FIG. 3 in the practice of the method of the invention. When the apparatus 30 of FIG. 4 is utilized, the relative movement between the exterior surface of the sintered/porous tube 32 and the initially contaminated liquid flowing through the tank 34 depends upon the operation of the motor 36 rather than the flow rate of the liquid. This allows a greater number of sub-micron size bubbles of oxidizing gas to be dispersed into the initially contaminated liquid than would be possible if the cleaving of sub-micron sized bubbles of oxidizing gas from the exterior surface of the tube 32 depended upon the flow of liquid alone. In this manner the efficiency of the oxidation reaction can be further increased.

When the apparatus 60 of FIG. 5 is utilized, the relative movement between the exterior surface of the sintered/porous tube 62 and the initially contaminated liquid flowing through the tank 34 is greatly increased by the operation of the turbines 66. This allows a greater number of sub-micron size bubbles of oxidizing gas to be dispersed into the initially contaminated liquid than would be possible if the cleaving of sub-micron sized bubbles of oxidizing gas from the exterior surface of the tube 62 depended upon the flow of liquid alone. In this manner the efficiency of the oxidation reaction can be further increased.

Figure 6:
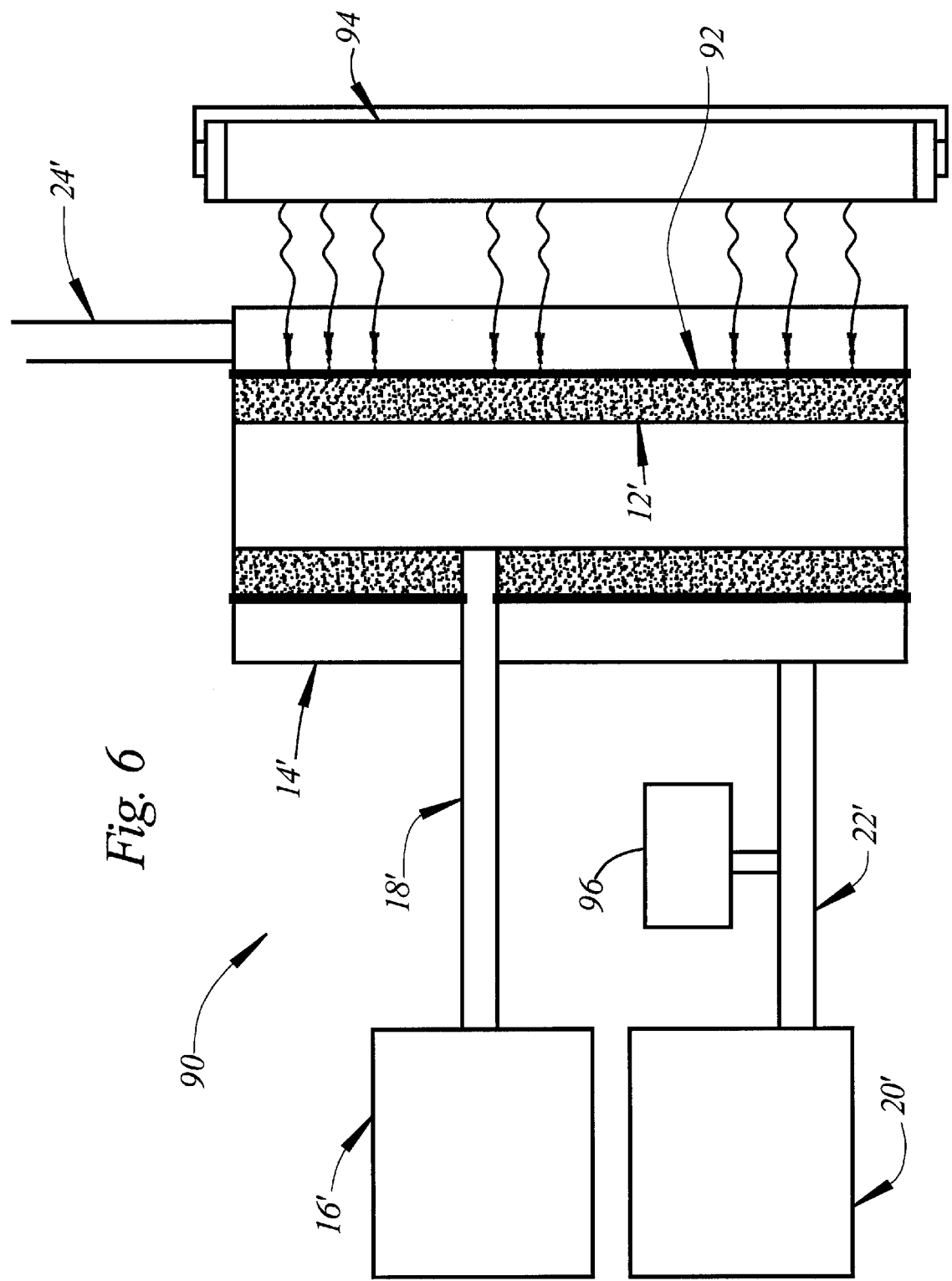
FIG. 6 is a diagrammatic illustration of a third embodiment of the invention.

Referring now to FIG. 6, there is shown an apparatus 90 incorporating a third embodiment of the invention. The apparatus 90 includes many component parts which are substantially identical in construction and function to the component parts of the apparatus 10 illustrated in FIG. 3 and described hereinabove in conjunction therewith. Such identical component parts are designated in FIG. 6 with the same reference numerals utilized in the description of the apparatus 10, but are differentiated thereof by means of a prime (') designation.

The apparatus 90 differs from the apparatus 10 in that the sintered/porous tube 12' thereof is provided with a photocatalytic layer 92 on its exterior surface. The photocatalytic layer 92 may be activated by ultraviolet radiation from a source 94. Alternatively, the photocatalytic layer 92 may be activated by sunlight, or by visible light or by other portions of the electromagnetic spectrum.

Activation of the photocatalytic layer 92 results in the formation of hydroxyl radicals in the initially contaminated liquid flowing between the sintered/porous tube 12' and the tank 14'. The hydroxyl radicals thus formed augment the action of an oxidizing gas or an oxidizing liquid in the removal of organic contaminants from the initially contaminated liquid.

Specifically, ozone may be utilized in the operation of the apparatus 90. Ozone is manufactured by passing oxygen, or air containing oxygen, through an electrically generated corona discharge. Although commonly referred to as "ozone", the resulting oxidizing gas actually comprises 20% or less of ozone, with the remainder comprising oxygen or air.

Upon activation of the photocatalytic layer 92 on the exterior of the sintered tube 12', the ozone component of the oxidizing gas generates hydroxyl radicals more efficiently than would otherwise be the case. Additionally, the oxygen component of the oxidizing gas also responds to the activation of the photocatalytic layer 92 to produce hydroxyl radicals. As will be appreciated by those skilled in the art, it is the hydroxyl radicals that actually comprise the oxidizing agent in the operation of the apparatus 90.

The apparatus 90 may also utilize chlorine dioxide as the oxidizing gas. In the operation of the apparatus 90, air or oxygen is mixed into the chlorine dioxide with the resulting mixture being directed through the sintered tube 12' and the photocatalytic layer 92 into the initially contaminated liquid in the tank 14'. The chlorine dioxide generates chlorine species as oxidizing agents. Upon activation of the photocatalytic layer 92, hydroxyl radicals are generated from the oxygen component of the oxidizing gas. Both the chlorine species and the hydroxyl radicals serve as oxidizing agents to remove organic contaminants from the liquid.

The apparatus 90 may also be operated utilizing a liquid oxidizing agent such as hydrogen peroxide. In such instances the liquid oxidizing agent is metered into the liquid stream from a source 96. Air, oxygen, or ozone is directed through the sintered tube 12' and the photocatalytic layer 92 into the initially contaminated liquid. Activation of the photocatalytic layer 92 forms hydroxyl radicals from the oxygen component of the gas stream. In this manner the quantity of the liquid oxidizing agent necessary to remove organic components from the initially contaminated liquid is substantially reduced.

It will be appreciated that the structural components of the apparatus 90 are virtually identical to those of the apparatus 10 of FIG. 3 except for the addition of the photocatalytic layer 92 and the source of ultraviolet light radiation 94 (if used). Similar modifications can be made to the apparatus 30 of FIG. 4, that is, a photocatalytic layer can be applied to the exterior surface of the sintered/porous tube 32 for activation by a source of ultraviolet radiation or sunlight. Likewise, the exterior surface of the sintered/porous tube 62 of the apparatus 60 of FIG. 5 may be provided with a photocatalytic layer adapted for activation by the source of ultraviolet radiation or sunlight. As indicated hereandabove, the generation of sub-micron bubbles in the initially contaminated liquid is increased by means of the motor of the apparatus 30 or the turbines of the apparatus 60 as well as the fact that the sub-micron size of the bubbles causes them to move more slowly through the contaminanted liquid, thereby increasing reaction efficiency.

Figure 7:
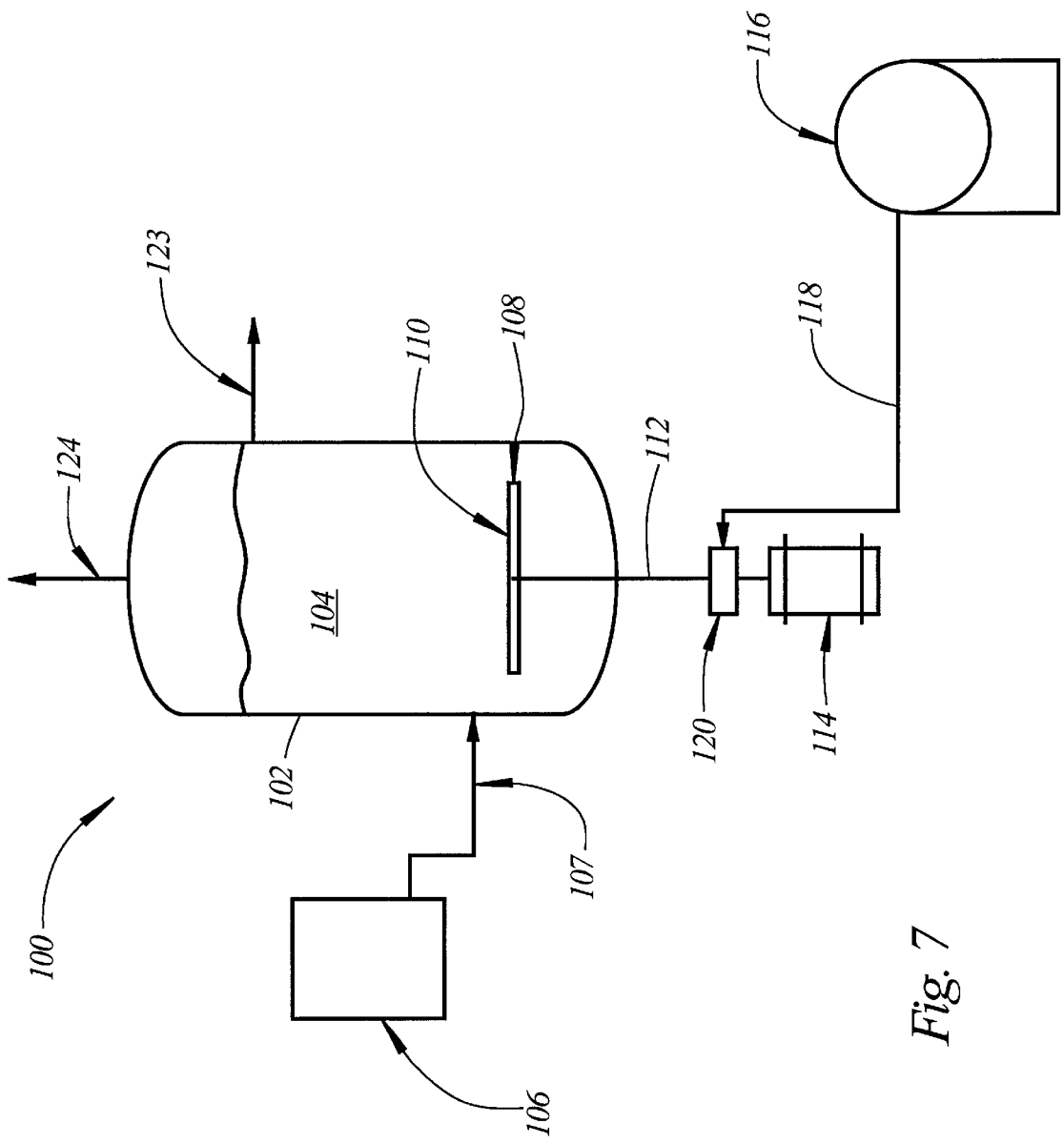
FIG. 7 is a diagrammatic illustration of a fourth embodiment of the invention.
Figure 8:
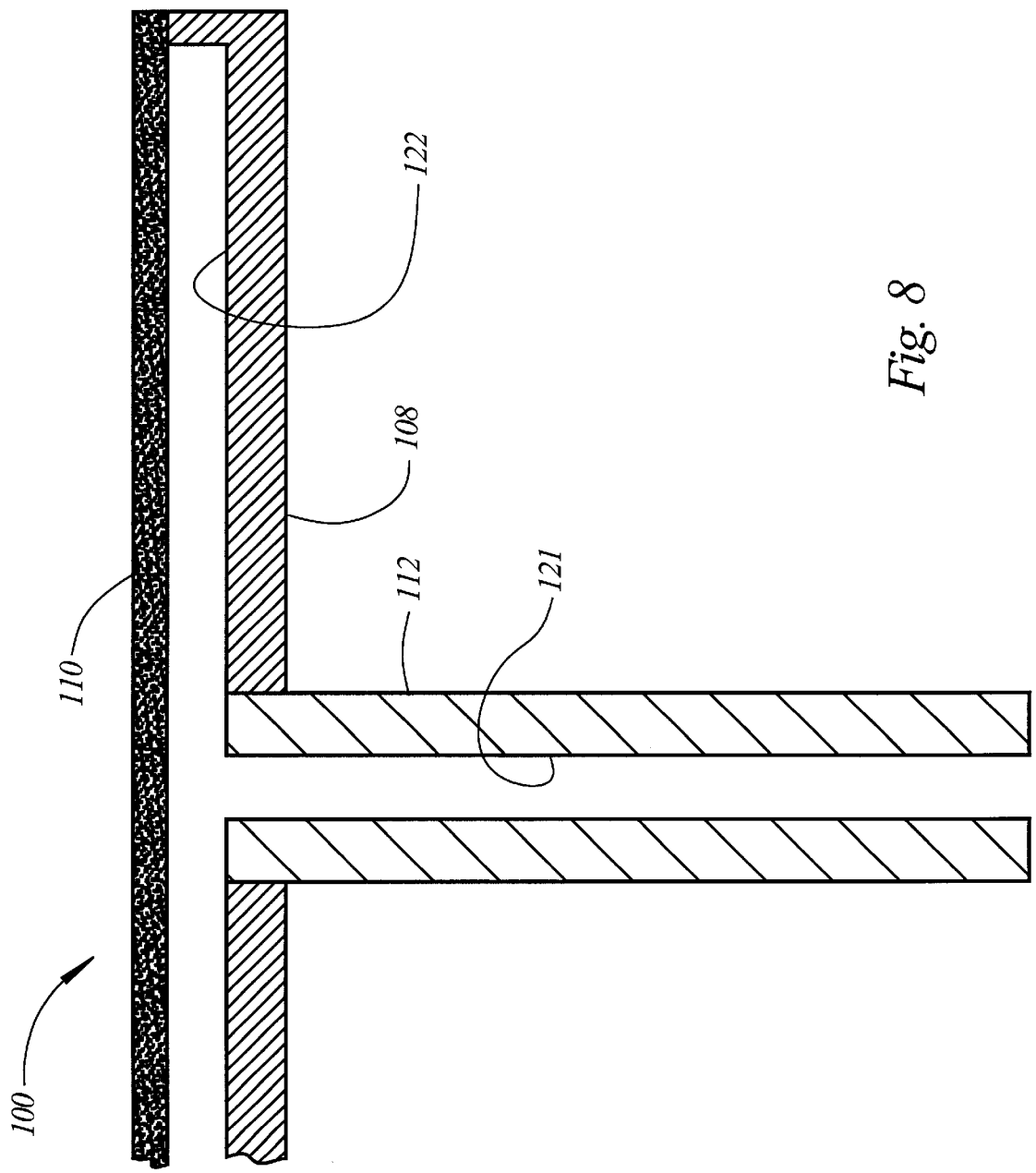
FIG. 8 is a further illustration of the embodiment of FIG. 7.

Referring now to FIGS. 7 and 8, there is shown a method of and apparatus for treating contaminated liquid 100 comprising a fourth embodiment of the invention. In accordance with a fourth embodiment of the invention, there is provided a tank 102 having a quantity of contaminated water or other contaminated liquid 104 contained therein. Water or other contaminated liquid is supplied to the tank 102 from a source 106 through piping 107.

A hollow disk 108 is mounted in the lower portion of the tank 102. As is best shown in FIG. 8, the disk 108 includes a gas permeable partition 110 supported on a tube 112 for rotation within the tank 102 under the operation under a motor 114. The partition 110 may comprise sintered glass, sintered ceramic, or porous ceramic materials depending upon the requirements of particular applications of the invention. Oxidizing gas received from a supply 116 is directed through piping 118 and a suitable commutator 120 into the tube 112 and through the tube 112 into the interior of the hollow disk 108. The tube 112 has a hollow interior 121 and the disk 108 has a hollow interior 122 connected in fluid communication therewith.

The disk 108 is supplied with oxidizing gas at a pressure just high enough to overcome the head pressure of the water or other liquid 104. The disk 108 is rotated by the motor 114 at an appropriate speed in contact with the water or other liquid 104 such that a shearing phenomenon occurs at the surface of the gas permeable partition 110 thus producing bubbles of extremely small, i.e., sub-micron size. The extreme small size of the bubbles thus produced results in a surface area to volume ratio which significantly improves the efficiency of the reaction, in particular because the required vertical height of the tank 102 and therefore the pressure of the gas is substantially reduced due to the slower movement of the small bubbles in the liquid. Liquid is recovered from the tank 102 through outlet 123 and any residual gas is recovered from the tank 102 through outlet 124.

Figure 9:
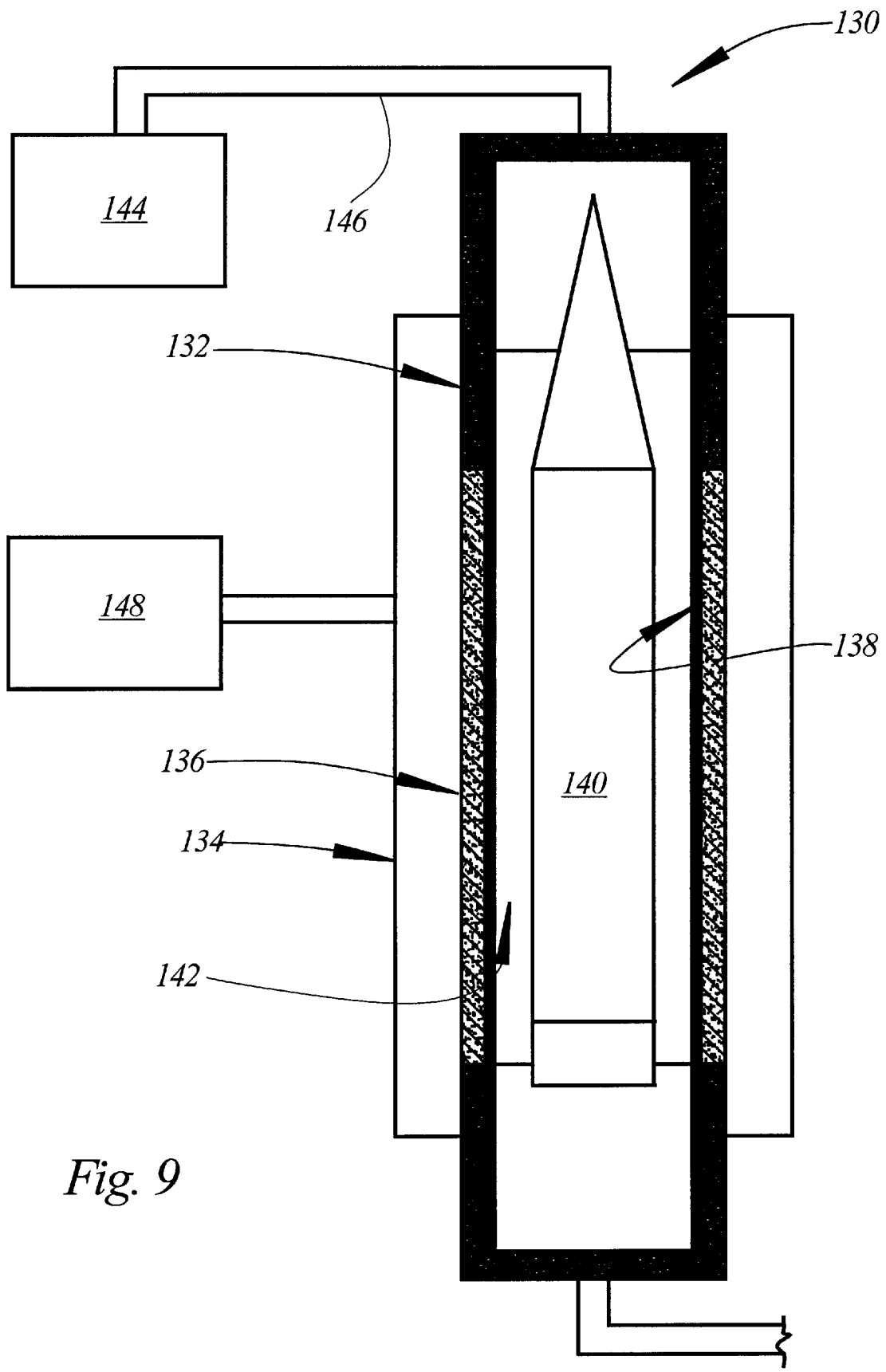
FIG. 9 is a diagrammatic illustration of a fifth embodiment of the invention.

Referring to FIG. 9, a method of and apparatus for treating contaminated liquids with oxidizing gases 130 comprising a fifth embodiment of the invention is diagrammatically illustrated. The apparatus 130 includes a tubular member 132 which extends through a housing 134. The component parts of the tubular member 132 in the housing 134 are formed from materials which are impervious to attack by oxidizing gases such as ozone and chlorine dioxide.

The tubular member 132 includes a porous section 136 which is entirely contained by the housing 134. Thus, the porous section 136 defines a gas permeable partition between the interior of the housing 134 and the interior of the tubular member 132. The gas permeable partition is characterized by extremely small pores. For example, the porous section 136 may comprise a porous ceramic material characterized by pore sizes having diameters of less than 1 micron. Alternatively, the porous section 136 may be comprised of sintered glass characterized by pore sizes having diameters of less than 1 micron. As used herein, the term "diameter" is used in its usual sense when describing pores that are circular or nearly circular in configuration and is used to define the major dimension pores which are substantially noncircular in configuration.

The porous section 136 of the tubular member 132 may be provided with a photocatalytic layer 138 comprising the inner surface thereof. If used, the photocatalytic layer is formed from titanium dioxide or other well known photocatalytic materials.

A source of ultraviolet radiation 140 may be supported within the tubular member 132 by suitable brackets. The outside diameter of the source of ultraviolet radiation 140 is smaller than the inside diameter of the tubular member 132. There is thus provided an annulus 142 comprising the space between the source of ultraviolet radiation 140 and the tubular member 132 and extending the entire length of the porous section 136.

In the operation of the apparatus 130, contaminated liquid is caused to flow from a source 144 through piping 146 and through the interior of the tubular member 132 on a continual basis. The source 144 may comprise a typical reservoir or tank which receives contaminated liquid from any of a wide variety of sources. Alternatively, the source 144 may comprise the output of an industrial process.

Simultaneously with the flow of contaminated liquid through the tubular member 132, an oxidizing gas is directed from a source 148 through piping 150 into the interior of the housing 134. The oxidizing gas preferably comprises either ozone or chlorine dioxide, however, other oxidizing gases may also be utilized in the practice of the invention. When either ozone or chlorine dioxide is used, the source 148 comprises apparatus for manufacturing the oxidizing gas with the oxidizing gas being directed into the housing 134 immediately upon its manufacture.

In the operation of the apparatus 130, liquid does not flow outwardly from the tubular member 132 through the porous section 136 into the housing 134. To the contrary, the oxidizing gas within the housing 134 is maintained at a pressure sufficient to prevent the flow of liquid outwardly through the porous section 136 and to assure the continuous flow of oxidizing gas inwardly through the gas permeable partition into the annulus 142.

As the oxidizing gas is caused to flow inwardly through the porous section 136 of the tubular member 132, contaminated liquid from the source 144 continually flows through the tubular member 132. The movement of the contaminated liquid across the interior surface of the porous section 136 of the tubular member 132 continually cleaves sub-micron size bubbles of oxidizing gas which are immediately dispersed into the flowing liquid. The sub-micron size bubbles of oxidizing gas are dispersed into the flowing liquid causing immediate oxidation of the organic contaminants within the flowing liquid.

If used, the source of ultraviolet radiation 140 is continuously operated during the flow of contaminated liquid through the annulus 142 and the simultaneous flow of oxidizing gas through the porous section 136 of the tubular member 132. The presence of ultraviolet radiation in the contaminated liquid during the dispersal of sub-micron size bubbles of oxidizing gas therein substantially improves the kinetics of the oxidation reaction. In this manner both the speed and the efficiency at which contaminants in the contaminated liquid are oxidized are substantially improved. If used, the photocatalytic layer 138 is activated by the radiation source 140 to produce hydroxyl radicals in the flowing liquid.

Those skilled in the art will appreciate the fact that the several embodiments of the present invention which are described hereinabove are markedly different from bioreactors of the type utilized to remove solid waste from waste water. In a bioreactor, oxygen which is typically in the form of air, is dispersed into a sludge or slurry containing solid waste for the purpose of nurturing microorganisms also contained therein. The microorganisms thus nourished digest the solid waste from the sludge or slurry thereby rendering the waste water suitable for return to rivers, etc. Thus, in the operation of a bioreactor, the solid waste material is not oxidized by the oxygen which is dispersed therein but instead is digested by microorganisms which are nourished by the dispersed oxygen.

The method of the present invention is directly opposite to that of a bioreactor. Thus, in accordance with the method of the present invention, contaminants in a contaminated liquid are directly oxidized by the oxidizing gas which is dispersed into the contaminated liquid in the form of sub-micron size bubbles. The reaction takes place substantially instantly and results in substantially complete oxidation of the contaminants from the liquid. The method of the present invention cannot be used in bioreactors because the oxidizing gases used in the method of the present invention would kill microorganisms which are essential to the successful operation of a bioreactor.

Figure 10:
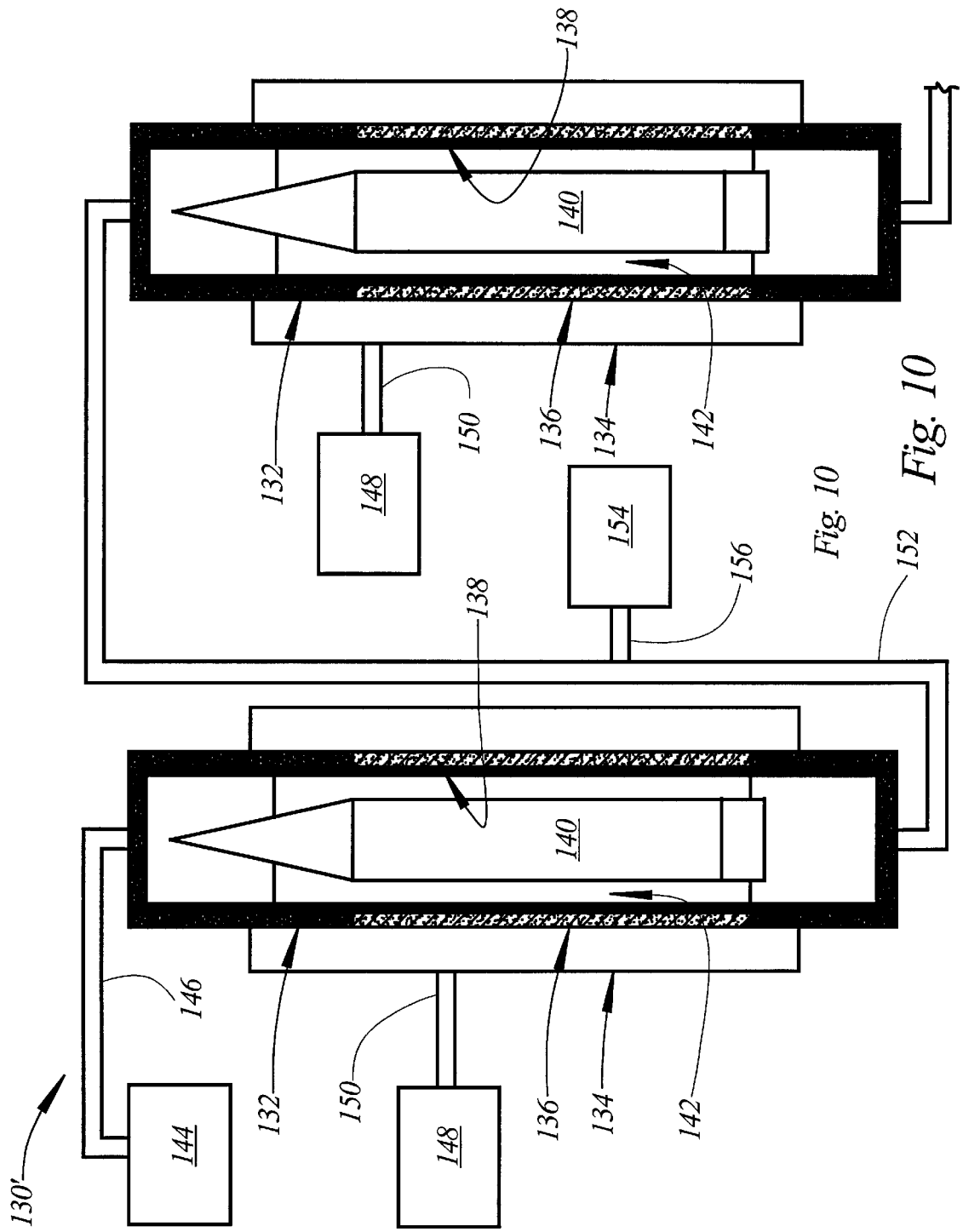
FIG. 10 is a diagrammatic illustration of sixth and seventh embodiments of the invention.

FIG. 10 illustrates sixth and seventh embodiments of the invention. In FIG. 10 there is shown an apparatus 130' for treatment of contaminated liquids with oxidizing gases which incorporates two treatment apparatus constructed in accordance with the present invention connected in series. In this manner, any contaminants remaining after a first treatment of a contaminated liquid with oxidizing gas is removed by a second treatment of the contaminated liquid with oxidizing gas.

Those skilled in the art will appreciate that the two apparatus illustrated in FIG. 10 are constructed in accordance with the fifth embodiment of the invention as illustrated in FIG. 9. However, the apparatus comprising the third and fourth embodiments of the invention and illustrated in FIGS. 3–8, inclusive, may also be used in the embodiment of FIG. 10. In this regard, it is not necessary that the two treatment apparatus utilized in the embodiment of FIG. 10 are identical. In fact, in certain applications of the invention, it may be advantageous to employ two or more entirely different treatment apparatus in series.

FIG. 10 further illustrates a source 154 which contains a base such as sodium hydroxide. The source 154 is connected to piping 152 extending from the first treatment apparatus to the second treatment apparatus by piping 156. The injection of a base into the flowing stream of initially contaminated liquid raises the pH of the liquid. Preferably, a pH of 8 or greater is achieved by the injection of the base into the flowing liquid stream. The higher pH insures conversion of ozone to hydroxyl radical, a powerful oxidizing agent. Further, the higher pH insures complete ozone destruction.

The base injection apparatus of FIG. 10 can be used in conjunction with a tandem gas treatment apparatus as shown. Alternatively, the base injection apparatus of FIG. 10 can be utilized with a unitary gas treatment apparatus constructed in accordance with any of the embodiments hereof. In the case of a unitary gas treatment apparatus, the base is injected into the flowing liquid in a quantity sufficient to raise the pH thereof to a level greater than 8 prior to directing the flowing liquid into the oxidizing gas treatment apparatus.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. A method of treating used petroleum distillates including the steps of:

providing a gas impervious enclosure;

providing a liquid passageway;

providing lie liquid passageway with a gas permeable porous portion characterized by pores having diameters of about 1 micron or less;

extending the liquid passageway through the gas impervious enclosure with the porous portion of the liquid passageway being entirely contained within the gas impervious enclosure;

providing an oxidizing gas selected from the group including ozone and chlorine dioxide;

directing the oxidizing gas into the gas impervious enclosure;

maintaining the oxidizing gas within the gas impervious enclosure at a pressure sufficiently high to cause the oxidizing gas to flow from the gas impervious enclosure through the porous portion of the liquid passageway and into the interior thereof, providing a used petroleum distillate;

causing the used petroleum distillate to flow through the liquid passageway simultaneously with the flow of oxidizing gas through the porous portion of the liquid passageway and thereby entraining submicron size bubbles of the oxidizing gas in the used petroleum distillate; and recovering the treated petroleum distillate.

* * * * *